United States Patent [19]

Tervol

[11] Patent Number: 4,610,478
[45] Date of Patent: Sep. 9, 1986

[54] FIBERGLASS HEADLINER WITH INTEGRAL ROOF BOWS AND ROOF RAILS

[75] Inventor: Steven A. Tervol, Drayton Plains, Mich.

[73] Assignee: General Motors Corporation, Detroit, Mich.

[21] Appl. No.: 585,157

[22] Filed: Mar. 1, 1984

[51] Int. Cl.[4] .............................................. B60J 7/00
[52] U.S. Cl. .................................... 296/214; 428/195
[58] Field of Search ................ 156/245; 428/195, 198, 428/196, 285, 286, 289, 290, 294, 295, 297, 105, 109, 247, 255, 360, 192, 280, 210; 296/214

[56] References Cited

U.S. PATENT DOCUMENTS

| | | | |
|---|---|---|---|
| 3,583,522 | 6/1971 | Rohweder et al. | 181/33 |
| 3,620,906 | 11/1971 | Hannes | 296/137 |
| 4,002,367 | 1/1977 | Thomas | 296/137 A |
| 4,073,535 | 2/1978 | Alfter et al. | 296/137 B |
| 4,255,485 | 3/1981 | Yau | 428/290 |
| 4,310,585 | 1/1982 | Shannon | 428/285 |
| 4,473,615 | 9/1984 | Rademacher et al. | 428/288 |
| 4,547,421 | 10/1985 | Dunbar | 428/290 |

FOREIGN PATENT DOCUMENTS 2742789  4/1979  Fed. Rep. of Germany.

Primary Examiner—James J. Bell
Attorney, Agent, or Firm—R. W. Tung

[57] ABSTRACT

A fiberglass headliner with integrally reinforced roof bows and roof rail for improved structural rigidity. Selected areas of a resin bonded fiberglass headliner are infiltrated and saturated with a suitable liquid thermosetting resin to a predetermined depth and width. The spaces between glass fibers in a resin bonded fiberglass panel are filled with this additional resin to form hardened and rigid sections when cured in a subsequent compression molding process. These hardened areas of resin saturation provide structural rigidity to partially support a vehicle roof panel and to temporarily carry various roof mounted accessories attached in a subassembly process to form a headliner module.

3 Claims, 6 Drawing Figures

FIBERGLASS HEADLINER WITH INTEGRAL ROOF BOWS AND ROOF RAILS

FIELD OF THE INVENTION

This invention relates to a resin bonded fiberglass headliner containing integral fiber reinforced resin roof bows and roof rails for structural rigidity, and a method of making such headliners.

BACKGROUND OF THE INVENTION

Automobile headliners typically are laminated of rigid foam or mat-like support base layer, an intermediate soft foam layer and a decorative cover layer. This laminate is molded to fit the contour of the interior of a vehicle roof. The headliner is preferably supported on each side of the roof by molding strips and by a dome light fixture if present.

Frequently the base layer is molded from a resin bonded fiberglass mat because of its low cost and superior sound deadening properties. Such fiberglass headliners are typically made by coating the surface of a very large number of individual glass fibers with a suitable thermosettable resin, mixing the fibers into a loose mat form supported between two layers of scrim material and compression molding the mat in a matched tool under predetermined temperature and pressure to form a panel. Unlike a paperboard base layer or a styrofoam base layer, a fiberglass base layer molded by this process may have cross sections of variable thicknesses to fit the specfic contour of a vehicle roof desired. A decorative cover can be applied to such compression-formed panel by adhesive or other means.

Resin bonded fiberglass headliner panels are very flexible. In addition to the usual edge attachment, they have required other attachments to the vehicle roof, such as hook and loop type fasteners or structural adhesives to prevent fluttering of the headliner under driving conditions. These extra attachments are costly.

Transverse sheet metal reinforcing strips have been inserted into the fiberglass panel during molding to make it self-supporting. This has been disclosed in published German application DE No. 3208804-A by Muller. However, the metal strips add weight to the headliner, require labor for the installation and reduce sound deadening properties.

OBJECTS OF THE INVENTION

Accordingly, it is an object of this invention to provide a resin bonded fiberglass headliner in which selected areas are stiffened by resin saturation. The selected areas may be in the configuration of integral reinforcing bows and rails providing structural rigidity to partially support the roof panel.

It is another object to provide a selectively resin stiffened fiberglass headliner to eliminate the need for redundant attachment methods required to avoid the fluttering problem.

A further object of this invention is to provide a selectively resin stiffened fiberglass headliner having suitable strength and stiffness to temporarily carry roof-mounted accessories such as passenger assist straps, coat hangers and sun visors.

Still another object of this invention is to provide a method of stiffening selected areas of a resin bonded fiberglass headliner panel with resin saturation of a similar resin.

SUMMARY OF THE INVENTION

In accordance with a preferred practice of my invention, a resin bonded fiberglass panel having integral selectively stiffened portions is made as follows. A blank mat (suitably rectangular) of loose, thermosetting resin coated fiberglass is provided. A suitable liquid thermosetting resin is then sprayed or printed onto the mat in a predetermined pattern to a suitable depth. It is desired to provide sufficient resin to substantially fill the space between the fibers when the mat is subsequently molded. Preferably, the liquid thermosetting resin does not penetrate all the way through the mat for reasons that will become clear. The depth of penetration by the liquid resin is controlled by adjusting the spraying pressure. The liquid thermoset resin used to penetrate the mat is preferably the same kind used in coating the glass fibers and forming the loose mat so that the cure temperature and condition of the resin remain the same during the compression molding process to facilitate curing.

It is preferable not to cause the liquid thermosetting resin to penetrate all the way through the fiberglass mat in order to retain better sound deadening at the unsaturated fiberglass surface.

The mat with selectively resin saturated regions is then compression molded into a panel, and the panel is trimmed into the desired shape of a headliner.

At this point, the panel may be described as follows. Most of the panel is a network of compacted glass fibers bonded together with thermosetting resin coating where fibers contact each other. However, there are voids between the fibers, and the panel is pervious to air. In the selected areas where the additional resin is applied, there is formed a substantially void-free bow or rail that is, in effect, a fiberglass reinforced resin saturated member. These resin stiffened areas are typically arranged as transversely spaced bows attached to a continuous peripheral rail.

A decorative fabric or vinyl sheet covering material backed with a thin urethane foam is bonded to the side of the fiberglass panel intended to face the interior of the vehicle.

In accordance with a particularly preferred embodiment of my invention, various roof mounted accessories may then be loosely attached to the headliner panel with self-tapping screws in the reinforced areas to form a headliner module. The self-tapping screws loosely mounting those accessories to the headliner module are ultimately driven into metal supports in the roof structure for final assembly to the vehicle body.

DETAILED DESCRIPTION OF A PREFERRED EMBODIMENT

Figure 1:
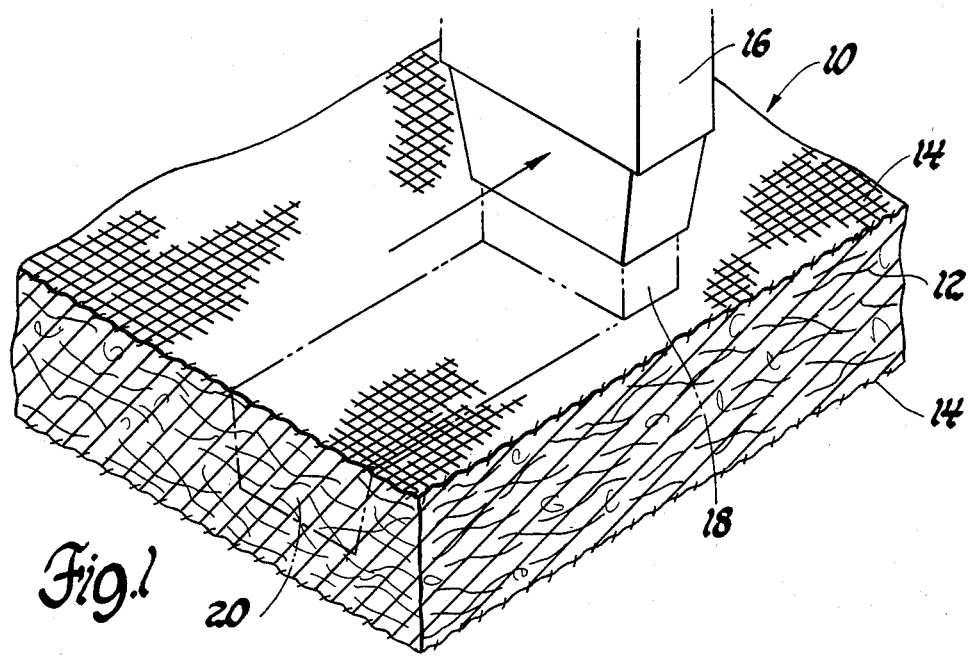
FIG. 1 is a fragmentary view of a loose fiberglass mat contained in two scrim layers being sprayed with thermosettable resin.

Reference is made initially to FIG. 1 where a mat 10 of loose resin coated (thermosetting resin) glass fibers 12 is shown. The fiber mat is contained between two layers of scrim 14 typically of a light weight cheesecloth material. The thickness of the mat is generally between 25 and 76 millimeters. The purpose of using the scrim is to contain the fibers in the surface layer and to prevent them from falling off the mat. After a fiberglass mat is made, integral reinforcement can be achieved by localized resin impregnation to a state of saturation by using either a spraying technique or a printing technique at predetermined areas. FIG. 1 shows a process where a spray nozzle 16 was used to spray liquid resin 18 under pressure into the fiberglass mat through scrim 14. It has been found that by controlling the width of the spray nozzle and the pressure of the spraying liquid, a desired width and a desired depth of resin penetration (area 20 in FIG. 1) can be achieved. A typical commercially available liquid thermosetting resin such as polyester can be used at suitable viscosity levels. It is desirable to use a resin in the impregnation process similar to that used in bonding the loose fiberglass mat so that in the compression molding process a suitable temperature and curing time can be selected for both resins. It has also been found that in order to minimize the loss of sound deadening properties in the fiberglass headliner due to resin impregnation, the depth of resin spray should be limited to approximately one-half to three-quarters of the thickness of the mat (see 20 in FIG. 1) and in any event should not be allowed to penetrate through the mat resulting in possible resin read through problems and loss of sound deadening properties. The width of the spray will be determined by design parameters such as the desired rigidity of the panel and the physical properties of the resin used. For instance, a width of approximately 1¼ inch to 1½ inch has been found satisfactory in obtaining suitable structural rigidity for a fiberglass headliner.

Figure 3:
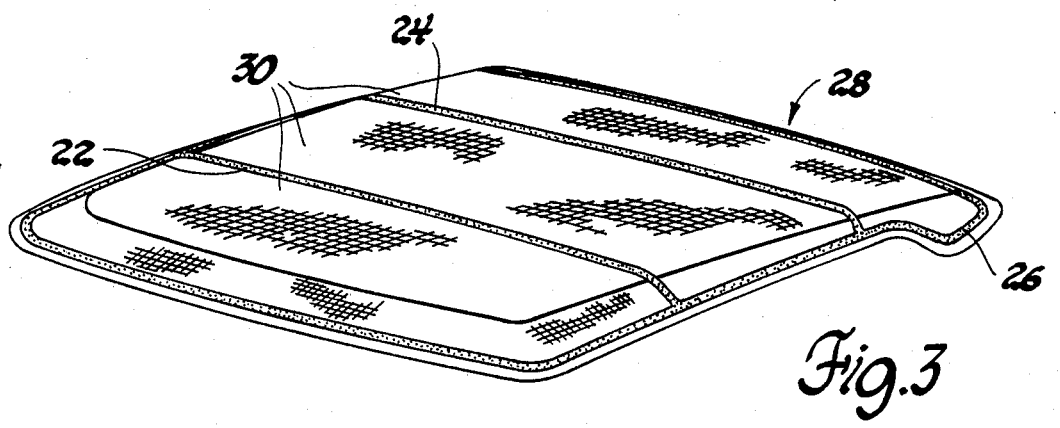
FIG. 3 shows an isometric view of a completed headliner assembly.

A suitable pattern of resin impregnation is exemplified by two or more transverse bows connected by a peripheral rail. This pattern, after molding, is depicted in FIG. 3 by bows 22, 24 and a peripheral rail 26.

The spray nozzle 16 in FIG. 1 can be controlled manually or by a robotic arm and operated in an automated preprogrammed pattern without any requirement of manual labor. The spraying operation can be performed on the fiberglass mat after it has been cut into a suitably sized blank. The viscosity of the liquid resin must be controlled in order to obtain the desired penetration of the mat during the spray process. Another potential process of resin impregnation being considered is the use of a continuous printing frame with numerous spray nozzles mounted therein. In the printing method, a different printing frame is required for each model of the fiberglass headliner in order to obtain the desired printing pattern. The benefit of this method is that a shorter cycle time for the resin impregnation process can be achieved.

Figure 2:
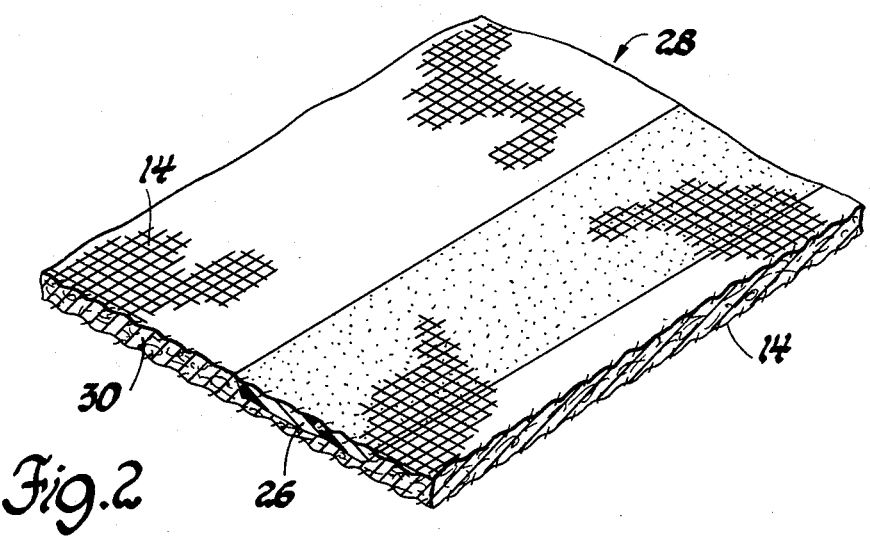
FIG. 2 is a fragmentary view of a molded reinforced fiberglass panel in accordance with this invention.

In FIG. 2, a portion of a fiberglass headliner panel 28 is shown that is formed by compression molding a selectively resin impregnated panel 10. FIG. 3 shows an entire headliner panel 28. The regions of panel without resin impregnation 30 are characterized by glass fibers closely bonded together by their original resin coating which is cured by the molding process. In those selected areas of the panel, illustrated at 26, to which resin was applied, a substantially non-porous stiffening member (here a headliner rail) consisting of cured thermosetting resin reinforced by glass fibers is formed. It is noted in FIG. 2 that the stiffening member does not extend all the way through the panel. The unreinforced portion of the panel is porous and absorbs sound waves.

In one example, where both the fiber coating resin and the reinforcing resin were a polyester composition, the mat was compressed and cured under a molding pressure of 207 kPa and a molding temperature of 154° C. for a molding time of 120 seconds.

One such fiberglass headliner 28 containing integral reinforcements is shown in FIG. 3 where the edges were trimmed off in a subsequent trimming process. In this specific sample, two reinforcing bows 22, 24 were molded into the fiberglass headliner to provide integral reinforcement in the transverse direction connected at both ends by a continuous reinforcing rail 26 formed along the perimeter of the headliner. A significant increase in the structural rigidity of the headliner is achieved by the addition of these reinforcing bows and the reinforcing rail. By suitably selecting the width of the bows and the rails and the depth of the penetration of the liquid resin, desirable structural rigidity can be designed into a fiberglass headliner.

This increased rigidity eliminates the fluttering noise frequently occurring in a fiberglass headliner without reinforcement due to the inherent flexibility of a nonreinforced panel. In order to avoid such fluttering noise, a fiberglass headliner without reinforcement usually requires attachment methods at or near the center of the headliner to the roof structure. Attachment methods such as those commercially available hook and loop type of separable attachment strips or other kinds of structural adhesives are normally used at increased expense in both labor and materials. Therefore, the resin impregnation process imparts savings to the manufacturing cost of fiberglass headliners while improving the overall quality of a vehicle.

FIG. 3 shows one of the preferred embodiments with two reinforcing bows and a continuous reinforcing rail by resin impregnation. Obviously, many combinations of reinforcing bows and rails can be used to fit the particular need of reinforcement and the specific geometric shape of the headliner. The determination of locations of the reinforcing bows and rails may also depend upon the desirable mounting locations of various roof mounted accessories contained in a headliner module. The highly densified regions of resin impregnation provide structural strength adequate for holding mounting screws or other mechanical attachment means. It is noted that the resin impregnated areas are substantially porous-free and have densities as high as that of a solid thermosetting resin. The remainder of the fiberglass panel has much lower density and contains only 5 to 20 weight percent of such thermosetting resin as original coating material for the glass fibers.

My unique integrally resin reinforced fiberglass headliners also permit savings in the assembly of vehicle interior components. Interior components such as passenger assist straps, coat hangers and sun visors can be pre-attached to the reinforced portions of the module outside the car. This subassembly of headliner and attachments can then be efficiently placed in the vehicle as a module.

Figure 4:
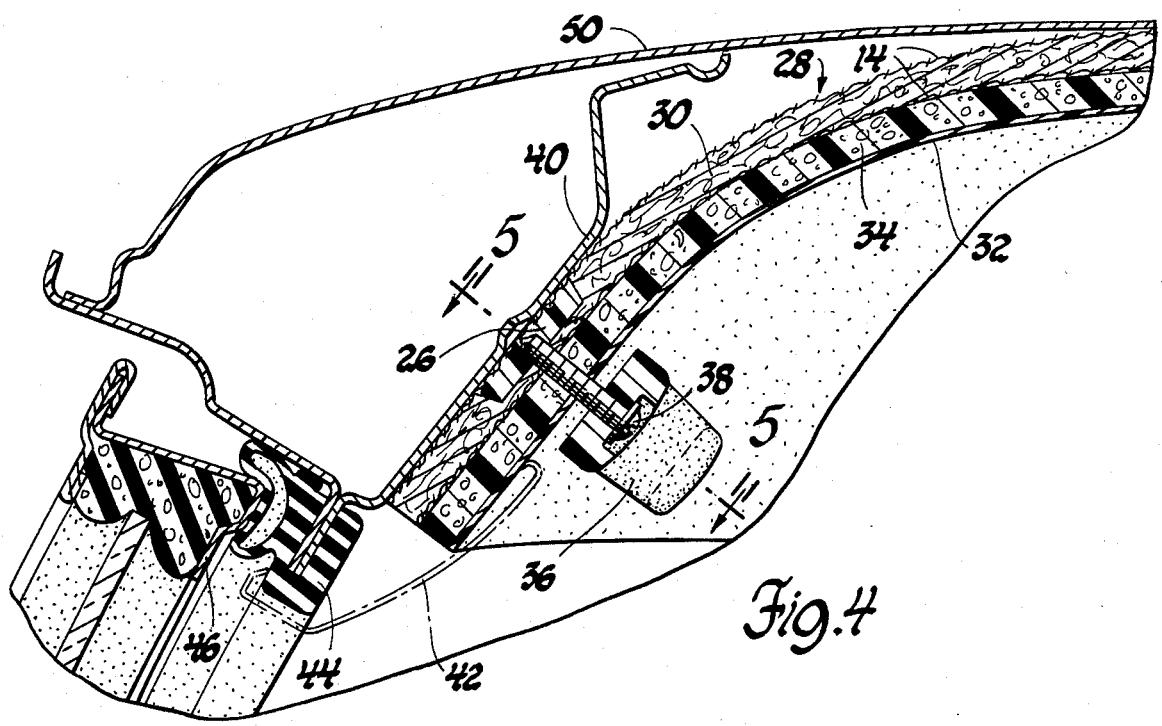
FIG. 4 is a transverse sectional view of a portion of a subject headliner assembly affixed to a vehicle roof in the vicinity of a door. The view also shows a passenger assist strap loosely assembled to the headliner.

FIG. 4 shows a sectional view of a vehicle roof and door transverse to the center line of the vehicle. A fiberglass headliner unit is shown comprising a decorative cover 32 typically of a fabric or vinyl material, an intermediate foam backing 34 typically urethane foam, and a fiberglass headliner panel 28. The cover material with foam backing is bonded by a suitable adhesive to the headliner panel. The addition of the decorative cover with foam backing to the headliner panel serves to improve its aesthetic appearance and its sound deadening properties. The thickness of the decorative cover is generally less than ½ millimeter and the thickness of the foam backing is in the range of 2 to 6 millimeters. The thickness of the headliner panel ranges from about 3 to 18 millimeters.

Figure 5:
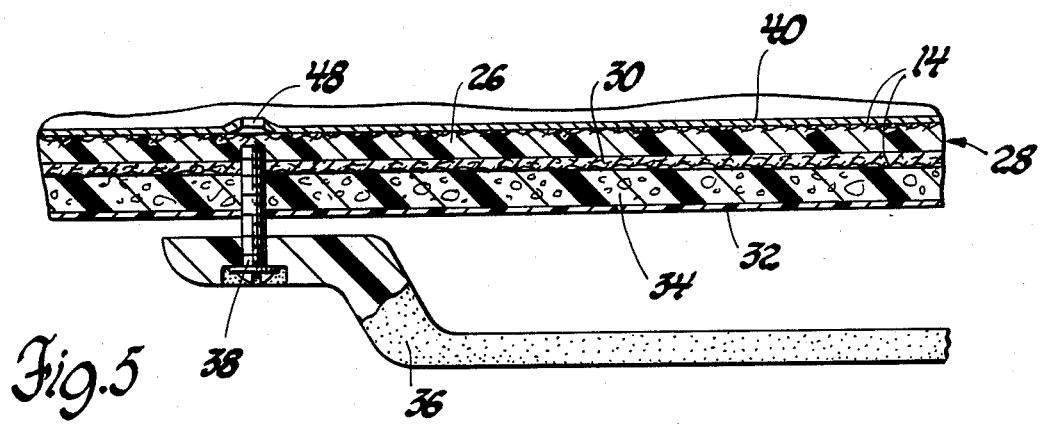
FIG. 5 is a cross-sectional view indicated on line 5—5 in FIG. 4.

An assist strap 36 is shown in FIGS. 4 and 5 loosely attached to the fiberglass headliner through the reinforcing rail 26 by the use of a self-tapping screw 38. The headliner is shown in its installed position mounted against inner roof rail 40. The edges of the headliner are concealed by the upper half of molding 42 running in the longitudinal direction of the vehicle. The lower half of molding 42 covers the attaching section of gasket 44 which is shown in a compressed state by the top edge of door 46 in closing position.

FIG. 5 shows an enlarged cross-sectional view indicated on line 5—5 in FIG. 4 showing the assist strap 36 loosely attached to the fiberglass headliner through the reinforcing rail 26 by the self-tapping screw 38.

Figure 6:
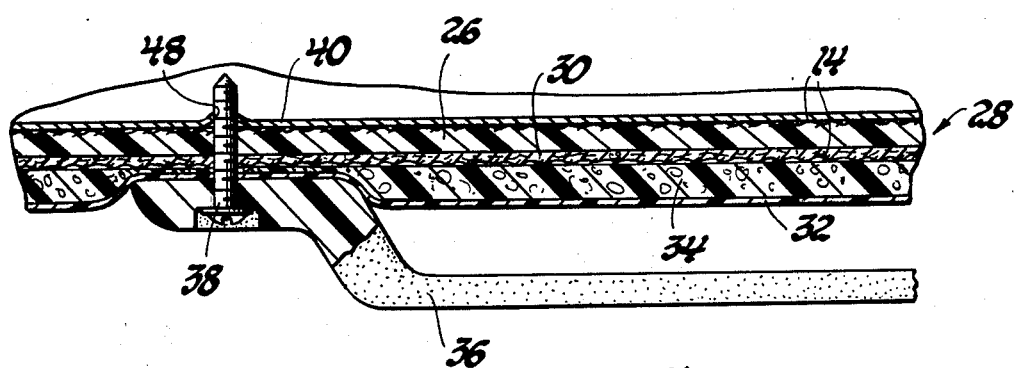
FIG. 6 is the same as FIG. 5 except that the assist strap is fully tightened to the roof sheet metal.

FIG. 6 is the same as FIG. 5 except that the self-tapping screw 38 is fully tightened to complete the assembly of the assist strap to the roof rail 40 through the aperture 48. In this fully assembled position, fiberglass headliner 28 serves to partially support the outer roof panel 50 to prevent it from fluttering under vehicle driving conditions.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. An automotive headliner panel of molded fiberglass and resin having integral reinforcing roof bows and roof rails comprising,
   a network of resin bonded glass fibers that defines the panel wherein there are spaces between fibers such that the panel is air permeable,
   a plurality of integral roof bows extending transversely of the panel between the edges thereof,
   a roof rail extending along the edges of the panel and connecting the roof bows,
   said reinforcing roof bows and roof rail being formed by saturating selected localized areas of the resin bonded fibrous network with additional resin to a predetermined depth and width and curing the additional resin.

2. An automotive headliner module including a headliner panel of molded fiberglass and resin having integral reinforcing roof bows and roof rails of sufficient rigidity to temporarily support roof panel mounted accessories comprising, in combination,
   a panel formed by compression molding a mat of resin coated glass fibers,
   a plurality of integral roof bows extending transversely of the panel between the edges thereof,
   a roof rail extending along the edges of the panel and connecting the roof bows,
   said reinforcing roof bows and rails being formed by saturating localized areas of the fibrous mat with resin to a predetermined depth and width and curing the saturated localized areas when the resin coating on the fibers is cured, and
   accessories mounted to the roof panel at the reinforcing bows and rail.

3. In combination with a vehicle having a roof panel and a headliner panel, a headliner located in adjacent reinforcing relationship to the roof panel comprising,
   an air permeable network of resin bonded glass fibers, said panel having a first surface facing the roof panel and a second surface facing the interior of the vehicle,
   a plurality of integral reinforcing roof bows extending transversely of the panel between the opposite edges thereof,
   a roof rail extending along each such edge of the panel and integrally connected to the roof bows,
   said reinforcing roof bows and roof rail being generally of a rectangular cross-sectional shape projeting inwardly from the first surface towarda but not to the second surface of the headliner panel,
   said reinforcing roof bows and roof rail being formed of hardened resin filling the spaces between resin bonded glass fibers.

* * * * *